United States Patent [19]

Arnaud et al.

[11] 4,221,699
[45] Sep. 9, 1980

[54] PRODUCTION OF EXTRUDED POLYOLEFIN PRODUCTS

[75] Inventors: Claude J. Arnaud, Riom; Jean M. Quemner, Clermont-Ferrand; Gaston P. Roche, Riom, all of France

[73] Assignee: Societe Anonyme de Telecommunications, Paris, France

[21] Appl. No.: 901,296

[22] Filed: May 1, 1978

[30] Foreign Application Priority Data

Jun. 14, 1977 [FR] France .............................. 77 18128

[51] Int. Cl.² .......................... C08K 5/36; C08K 5/37
[52] U.S. Cl. ............................... 260/45.7 S; 525/346
[58] Field of Search ...................... 260/45.7 S; 526/33

[56] References Cited

U.S. PATENT DOCUMENTS

| 3,856,889 | 12/1974 | McConnell | 260/45.7 S |
| 3,934,056 | 1/1976 | Yoshida et al. | 260/45.7 S |
| 3,984,940 | 10/1976 | Rerch et al. | 260/45.7 S |

FOREIGN PATENT DOCUMENTS

| 772938 | 4/1957 | United Kingdom | 260/45.7 S |
| 780289 | 6/1957 | United Kingdom | 260/45.7 S |

*Primary Examiner*—William F. Hamrock
*Attorney, Agent, or Firm*—James C. Jangarathis

[57] ABSTRACT

Production of extruded products wherein a polyolefin composition, a volatile, flammable liquid organic peroxide cross-linking agent and an antioxidant are introduced into the inlet of an extruder, with the antioxidant being a thio-bisphenol soluble in the peroxide having a melting point of less than 125° C. of the general formula $$(R'\ C_6H_2\text{—}R''\ OH)_2\ S_x$$

wherein x is a whole number equal to 1, 2 or 3. The preferred antioxidant is 2,2'-thio-bis(6-t-butyl-p-cresol).

14 Claims, No Drawings

PRODUCTION OF EXTRUDED POLYOLEFIN PRODUCTS

The present invention relates to the fabrication of extruded products based on polyolefin compositions, and their use in the formation of insulating or semiconducting layers of sheathings of low-, intermediate- or high-voltage electric cables.

The term "polyolefin compositions" is understood to mean, in particular, the compositions based on ethylene polymers, e.g., polyethylenes, polypropylenes, etc.; copolymers and terpolymers in which one of the components in an ethylene polymer, e.g., the ethylene-propylene copolymer (EPM), the ethylene-propylene-diene terpolymers (EDPM), the ethylene-vinyl acetate copolymers (EVA), etc.; and mixtures in which one of the basic products in an ethylene polymer.

These polyolefin compositions are usually extruded and then crosslinked in order that they may be used at elevated temperatures. In effect, this crosslinking operation permits the insulating material to withstand continuous service temperatures of the order of 90° C. while retaining its good crush resistance. Moreover, as a result of the crosslinking, this temperature may be increased for short periods of time to up to 200°-250° C. without causing any appreciable damage to the insulation.

U.S. Patent Application Ser. No. 669,917, filed on Mar. 24, 1976 discloses a method for incorporating a crosslinking agent in the polyolefin composition in a single operation, directly at the inlet of the extruder, in order to avoid the preliminary formulation of the mixture which has been customary in previous techniques.

However, in the course of its extrusion and subsequent use as cable sheathing the polyolefin composition is subjected to thermal and photothermal oxidation. This oxidation takes place both during aging in air and during the crosslinking phase proper. The effect of this oxidation is that the mechanical characteristics of the composition are changed.

Thus, the addition of an antioxidant would make it possible to protect these compositions from oxidation and to provide the finished product with a good thermal and photothermal stability. However, the antioxidant or antioxidants used must not inhibit the crosslinking of the composition.

In addition, they should withstand, without appreciable loss, the temperatures of crosslinking and later the service temperature of the cable. Furthermore these antioxidants should be sufficiently pure so as not to modify the dielectric properties of the cable sheathing. Such conditions limit the choice of antioxidants that can be used in crosslinkable polyolefin compositions. The above mentioned patent application recommends the use of antioxidants mixed with the crosslinking agent, e.g., peroxide, in order to avoid the preliminary mixing phase and the irregularities of proportioning which could occur when the additive is introduced at the inlet of the extruder. The above mentioned patent application cites, among the antioxidants soluble in peroxide, such phenolic antioxidants as 4,4'-thio-bis (6 tert.-butyl-m-cresol).

The object of the present invention is to improve the effectiveness of the antioxidants by selecting products whose qualities are compatible with the heat treatment involved during the extrusion operation and the subsequent crosslinking to which the polyolefin composition is subjected, and which are compatible with photothermal aging. The products chosen in accordance with the present invention are compatible with the process of introducing the crosslinking agent under conditions of temperature and pressure specified in the above mentioned patent application.

The method of fabrication of extruded products according to the present invention, based on crosslinked polyolefin compositions of the type in which a volatile and flammable liquid organic peroxide is introduced to the composition, as a crosslinking agent, at atmospheric pressure directly at the inlet of the extruder, simultaneously with the introduction of the composition to be crosslinked, and the antioxidant, said antioxidant being added as a protective agent, wherein the antioxidant is selected from the group of thio-bisphenols soluble in the peroxide having a melting point of less than 125° C. which do not adversely affect the crosslinking, of the general formula:

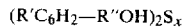

$$(R'C_6H_2-R''OH)_2S_x$$

wherein x is a whole number equal to 1, 2 or 3, and R' and R" are each alkyl, preferably $C_1$ to $C_5$ and most preferably ethyl, methyl or tert.-butyl groups.

These products make it possible to produce insulations for intermediate and high-voltage cables, wherein the insulating material is characterized by a very high degree of purity and homogeneity.

Other advantages will become evident upon reading the following specification.

The antioxidants according to the invention are powdered or granulated solids, and may be directly introduced into the storage tank containing the crosslinking agent such as the liquid peroxide. These antioxidants are dissolved in the peroxide by appropriate agitation, for example by the action of a propeller-type stirrer or a circulating pump.

Alternatively, the antioxidant may be premixed with the polyolefin; e.g., in a Banbury mixer, with the mixture of polyolefin and antioxidant being introduced into the extruder simultaneously with the addition of the liquid peroxide. A homogeneous mixture of the three components is produced in the extruder.

In addition, the antioxidants used in this manner must satisfy the requirements imposed on cable insulations both during their fabrication and during their use. Before being crosslinked, generally at temperatures of the order of 220°-250° C., the polyolefin compositions into which the antioxidant and crosslinking agent are introduced are subjected to the extrusion operation which exposes the substances present to temperatures for effecting melting of the compositions, without crosslinking, generally of the order of 125°-135° C. Thus, the antioxidant according to the present invention is chosen for the fact that its melting point is below the temperatures prevailing in the various sections of the extruder in which the material is processed to effect melting without crosslinking. Furthermore, the antioxidant according to the present invention should be maximally soluble in the liquid peroxide in order to assure a perfectly homogeneous distribution in the cable insulation. Moreover, this antioxidant should possess a high degree of purity, which may be achieved by subjecting it to one or more recrystallizations. In addition, since the antioxidant and the peroxide form a composition of two substances having different functions—one being a free radical captor and the other a free radical donor—the antioxidant according to the present invention will be chosen from the group of antioxidants which exert the minimum inhibiting effect on organic peroxides. Thus the two substances present in the polyolefinic composition will be able to fulfill their specific role in an effective manner.

The antioxidants, which are endowed with the characteristics required for electric cable insulations and for their fabrication, are chosen from the group of thio-bisphenols soluble in the peroxide having a melting point of less than 125° C. whose formula is

wherein x is a whole number equal to 1, 2 or 3 and R' and R" are as previously defined, most preferably methyl, ethyl or tert.-butyl groups.

The preferred antioxidant, thio-bis-(2-t-butyl-4-methyl-phenol) (melting point: 84° C./86° C.), has the formula:

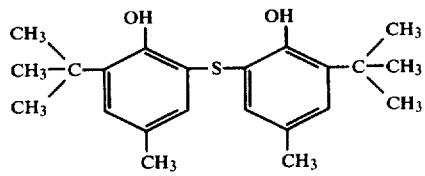

The 4',4 thio-bis(6-t-butyl-m-cresol) antioxidant disclosed in the prior application has a melting point of 158°/160° C. It has been found that such antioxidant causes problems in the extruder as a result of "plate out"; it may deposit in the extruder and produce irregularities and failures in the extruded material.

The antioxidants employed in the present invention are introduced in predetermined proportions of the order of 0.15 to 0.35%, by weight, calculated on the basic resin of the polyolefinic composition. Such an antioxidant, added in proportions determined in this manner, is found to be highly resistant in the accelerated aging tests. In effect, the values of the mechanical characteristics after accelerated aging are preserved to an extent of 85% of the initial values. This applies both in the case of aging for 240 hours at 127° C. in a cylinder containing air at a pressure of 5.6 kg/cm².

The antioxidant is preferably employed in the process described in aforementioned U.S. Application Ser. No. 669,917 which is hereby incorporated by reference, with the antioxidant preferably being premixed with either the polymer and/or peroxide.

Samples obtained repeatedly and systematically during the control of the resistance of the insulation to accelerated aging aging have shown that the distribution of the antioxidant was perfectly homogeneous and the results were reproducible.

Such a composition is particularly useful in the fabrication of insulations for intermediate and high voltage electric cables which require an insulating material of a very high degree of purity and homogeneity.

The invention will be further described with respect to the following examples; however, the scope of the invention is not to be limited thereby:

EXAMPLE I

Thio-bis-(2-t-butyl-4-methyl phenol) antioxidant is dissolved in di-t-butylperoxide in an amount of 10 wt. percent of the peroxide. The mixture is introduced into an extruder simultaneously with polyethylene in the following amounts:

Polyethylene: 100 g.
Antioxidant: 0.22 g.
Peroxide: 2.2 g.

The composition is extruded and crosslinked under known conditions; e.g., 220° C. and a pressure of 20-23 bars.

The mechanical characteristics of the crosslinked composition subsequent to aging in an oven for 240 hours at 135° C. are 97% of such characteristics prior to aging.

EXAMPLE II

The antioxidant employed in Example I is admixed with a polyolefin composition as follows:

Polyethylene: 100 g.
Antioxidant: 0.3 g.
Carbon Black: 20 g.
White Filler: 30 g.

The above composition is introduced into an extruder (room temperature and atmospheric pressure) simultaneously with the peroxide employed in Example I.

The composition is crosslinked and the mechanical characteristics after aging in an oven for 1 month at 150° C. are 90% of the characteristics prior to aging.

We claim:

1. In a method of fabricating extruded products based on crosslinked polyolefin compositions, wherein a volatile and flammable liquid organic peroxide is introduced, as a crosslinking agent, directly at the inlet of an extruder, simultaneously with the introduction of the polyolefin to be crosslinked and an antioxidant, said antioxidant acting as a protective agent, the improvement comprising:

employing as said antioxidant a member selected from the group of thio-bisphenols soluble in said peroxide, having a melting point of less than 125° C. of the general formula:

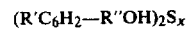

wherein x is a whole number equal to 1, 2 or 3 and R' and R" are each alkyl.

2. A method according to claim 1 wherein the antioxidant is used in a proportion of 0.15 to 0.35%, by weight, calculated on the basic resin of the polyolefin composition.

3. A method according to claim 2 wherein the antioxidant has the structural formula:

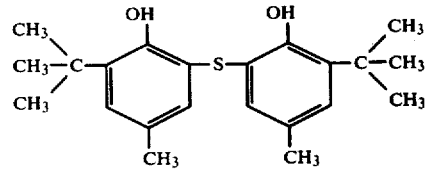

4. A method according to claim 1 wherein R' and R" are each lower alkyl.

5. A method according to claim 4 wherein R' and R" are each selected from the group consisting of methyl, ethyl and tert.-butyl.

6. A method according to claim 5 wherein the antioxidant is used in a proportion of 0.15 to 0.35%, by weight, calculated on the basic resin of the polyolefin composition.

7. A method according to claim 6 wherein the antioxidant is premixed with the polyolefin.

8. A method according to claim 6 wherein the antioxidant is premixed with the peroxide.

9. A method according to claim 3 wherein the antioxidant is premixed with the polyolefin.

10. A method according to claim 3 wherein the antioxidant is premixed with the peroxide.

11. In a method of fabricating extruded products based on cross-linked polyethylene compositons, wherein a volatile and flammable liquid organic peroxide is introduced, as a cross-linking agent, directly at the inlet of an extruder, simultaneously with the introduction of the polyethylene to be cross linked and an antioxidant, said antioxidant acting as a protective agent, the improvement comprising:

employing as said antioxidant and antioxidant having a melting point of less than 125° C. and the structural formula:

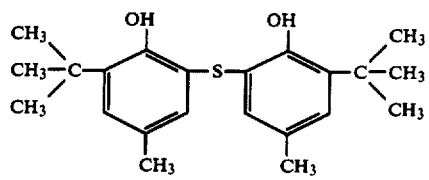

12. The process of claim 11 wherein the organic peroxide is di-t-butylperoxide.

13. The process of claim 12 wherein the extruded article is insulation for electric cables.

14. The process of claim 12 wherein the antioxidant is used in a proportion of 0.15 to 0.35%, by weight, of polyethylene.